(12) United States Patent
Rennecke et al.

(10) Patent No.: US 6,314,612 B1
(45) Date of Patent: Nov. 13, 2001

(54) DOOR HINGE WITH A LOCKING DEVICE BASED ON A FIELD FORCE

(75) Inventors: Dirk Rennecke, Andernach; Luciano Berardinucci, Koblenz, both of (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 09/522,646

(22) Filed: Mar. 10, 2000

(30) Foreign Application Priority Data

Mar. 11, 1999 (DE) .............................. 199 10 782

(51) Int. Cl.⁷ ...................................... E05F 3/20
(52) U.S. Cl. .................. 16/54; 16/51; 16/82; 188/267.2; 49/137
(58) Field of Search .................. 16/54, 82, 51; 188/267.2; 84/179; 74/573 F; 49/137

(56) References Cited

U.S. PATENT DOCUMENTS

| | | | |
|---|---|---|---|
| 3,952,365 | * | 4/1976 | Grisebach ................................ 16/82 |
| 5,152,189 | * | 10/1992 | Miura et al. ........................ 74/573 F |
| 5,468,042 | * | 11/1995 | Heinrichs et al. ....................... 16/51 |
| 5,632,361 | * | 5/1997 | Wulff et al. ....................... 188/267.2 |
| 5,664,286 | * | 9/1997 | Sorimachi ................................ 16/82 |
| 5,697,122 | * | 12/1997 | Okabe et al. ............................. 16/82 |
| 5,816,372 | * | 10/1998 | Carlson et al. .................... 188/267.2 |
| 6,095,295 | * | 8/2000 | Park et al. ........................ 188/267.2 |
| 6,121,526 | * | 9/2000 | Kobori et al. .......................... 84/179 |

FOREIGN PATENT DOCUMENTS

| | | |
|---|---|---|
| 33 13 220 A1 | 10/1984 | (DE) . |
| 195 14 610 A1 | 11/1995 | (DE) . |
| 197 54 167 A1 | 6/1999 | (DE) . |

* cited by examiner

Primary Examiner—Lynne H. Browne
Assistant Examiner—Doug Hutton
(74) Attorney, Agent, or Firm—Baker Botts L.L.P.

(57) ABSTRACT

Door hinge with a locking device based on a field force, including a cylinder divided by a piston into working spaces that are filled with an operating medium whose viscosity can be changed by means of a field force. The working spaces are connected to one another by at least one flow connection that is subject to the influence of a field force generating element. The door hinge is designed as a pivot bearing, wherein the cylinder takes the form of a bearing eye and the piston takes the form of a rotary piston with at least one blade.

7 Claims, 2 Drawing Sheets

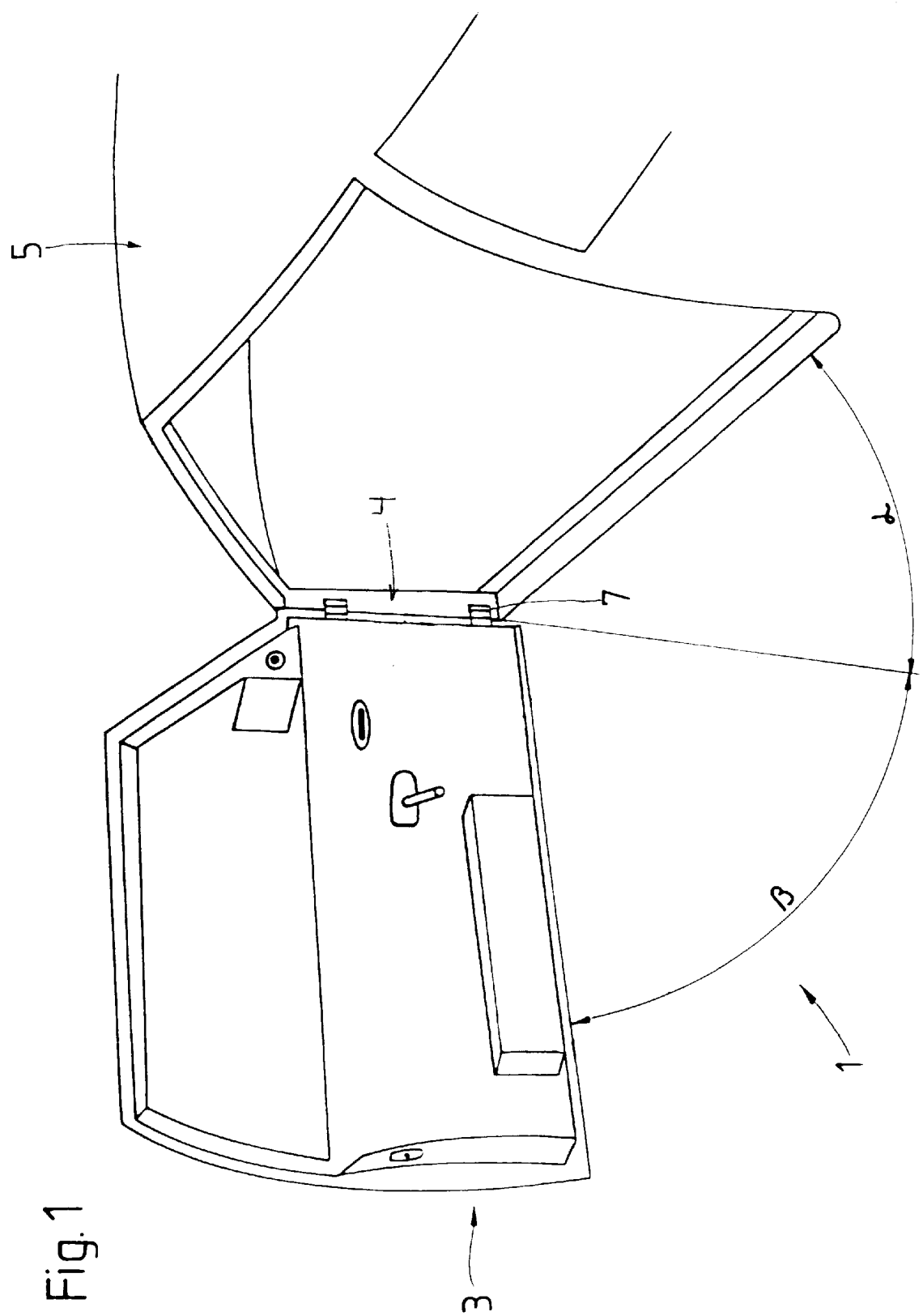

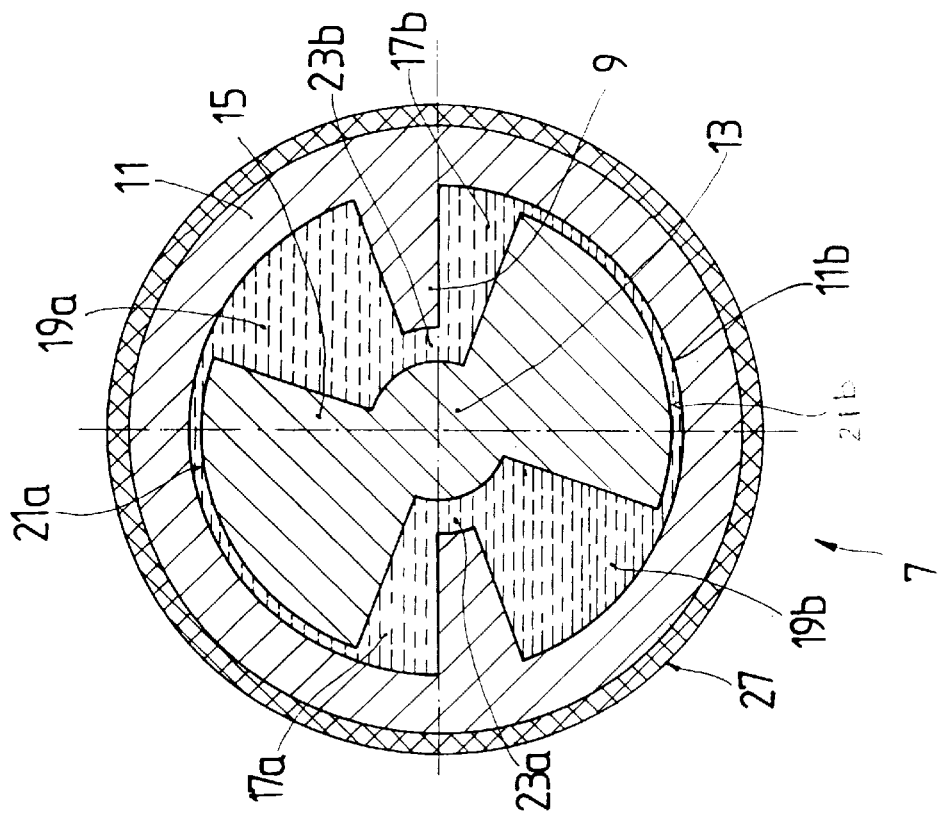
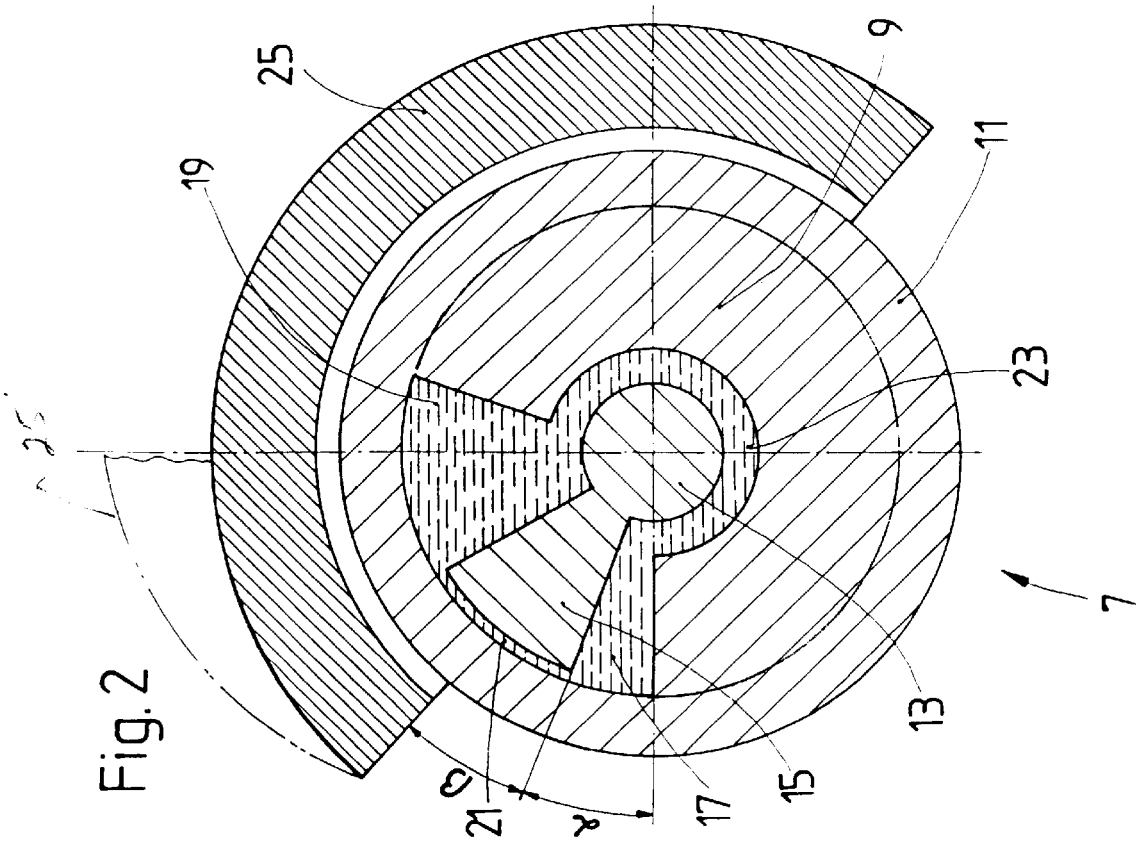

DOOR HINGE WITH A LOCKING DEVICE BASED ON A FIELD FORCE

FIELD OF THE INVENTION

The invention relates to a door hinge incorporating a fluid-operated locking device in which the viscosity of the operating fluid medium can be changed by the application of a field force.

THE PRIOR ART

U.S. Pat. No. 5,468,042 discloses a door hinge constructed as a piston-cylinder assembly that is arranged between the A pillar and the door of a motor vehicle. In the embodiments shown in FIG. 4a through 4c of the '042 patent, the piston-cylinder assembly is filled with an operating medium whose viscosity can be changed as a function of an electric field. Between two working spaces of the piston-cylinder assembly there exists a flow connection with a small enough cross-section that the voltage, which can be supplied by a vehicle's electrical system by means of electrodes, exerts electric field forces which cause the operating medium within the flow connection to become so viscous that the door is hydraulically locked. The '042 patent is commonly owned with the present application. The disclosure thereof, in its entirety, is hereby incorporated for all purposes.

In vehicles below a certain class, the installation spaces are not big enough for a piston-cylinder assembly, since the cylinder of the piston-cylinder assembly of necessity must be accommodated either in the A pillar or in the vehicle door.

SUMMARY

The object of the present invention is to provide a door hinge with a locking device based on a field force that can be used even in small installation spaces.

This object is attained, in accordance with the invention, in that the door hinge is designed as a pivot bearing, wherein the cylinder takes the form of a bearing eye and the piston takes the form of a rotary piston with at least one blade.

The major advantage of this solution is that the installation space heretofore provided is adequate for the door hinge with a locking device based on a field force. There is no need to undertake any design changes at all to the door or to the mating points on the body side.

In one embodiment, the flow connection takes the form of a gap between the blade and the inner wall of the cylinder. The advantage of this design is that the area of the gap relative to the field force generating element is very large in size compared to the area of a hole in the blade. The bigger the effective area for the field force generating element, the greater the possible change in viscosity, up to locking of the flow connection.

So that the door cannot be opened in an uncontrolled manner, for example by a gust of wind, the cylinder is equipped with at least one rib as a stop for limiting the rotary piston's angle of rotation. A further advantage is that an internal stop is maintenance-free and does not represent any visual impediment.

So that the door strikes the stop in a damped fashion, there is a second flow connection between the two working spaces that represents a second throttling point for the door hinge.

In one embodiment, the stop in the cylinder is comprised of a ring segment that has a circumferential groove for the second flow connection.

The door's motion is certain never to be locked in a first opening angle range, because a person wants to open the door at least wide enough to be able to enter and exit the vehicle even in a very tight parking space. For this reason, the field force generating element is preferably arranged concentrically to the cylinder and takes the form of a ring segment and only covers one rotation angle range of the rotary piston.

It is especially easy to install the field force generating element when it is located outside the cylinder.

When the field force generating element is outside the cylinder, the second flow connection is preferably implemented on the inner diameter of the stop. This accomplishes the goal that the second flow connection is not influenced by the field force generating element and the operating medium within the second flow connection is only subject to hydraulic principles.

Especially when a permanent magnet is used as a field force generating element with a magnetorheological operating medium, an advantageous arrangement may be provided wherein the field force generating element is rotatable independently of the cylinder or the rotary piston. By this means, it is possible to open the door by overcoming only hydraulic resistances and to lock the door in position by rotating the rotary piston into the region of the first flow connection. In this way, much less force is required than would be the case if one were to push the door open far enough that the door hinge's flow connection would have to be moved through the effective region of the permanent magnet.

In an embodiment with an electrorheological operating medium, the cylinder is designed as the field force generating element and is encased in an insulating ring for protection.

BRIEF DESCRIPTION OF THE DRAWINGS

The invention is described in greater detail hereinafter with reference to embodiments shown in the drawings, in which:

FIG. 1 shows an exemplary installation situation for the door hinge in a motor vehicle in accordance with the invention;

FIG. 2 is a cross sectional view of one embodiment of the door hinge in accordance with the invention, with a permanent magnet as field force generating element; and FIG. 3 is a cross sectional view of another embodiment of the door hinge in accordance with the invention, with an electrode as field force generating element.

DETAILED DESCRIPTION

FIG. 1 shows a stylized view of a motor vehicle 1 with a vehicle door 3 that is joined to a pillar 4, in this case the A pillar, of the body 5 by means of at least one door hinge 7. In accordance with the invention, the door hinge can of course also be used for other rotating swivel elements for which a locked position is desired. In the case of the vehicle door 3, a minimum angle of opening $\alpha$ is necessary for people to enter and exit the vehicle. Particularly when cleaning or repair work is being done in the vehicle's interior, it can be necessary to open the door further, for which reason an angle of opening $\beta$ is provided. The maximum opening angle of the vehicle door is determined by a stop 9 inside the door hinge (see FIG. 2 and FIG. 3).

In FIG. 2, the door hinge 7 is shown in cross-section. The door hinge has a cylinder 11, which is connected to the body 5, for example. Located inside the cylinder is a rotary piston 13 with a blade 15. In addition, a ring segment is press fitted inside the cylinder as a stop 9. The cylinder 11 and the stop 9 together define a working chamber that is divided into two working spaces 17; 19 by the blade of the rotary piston. Between the two working spaces 17; 19 is a first flow connection 21 that is formed by the gap between the blade and the inner wall of the cylinder.

A second flow connection 23 is implemented as a groove in the stop 9. All working spaces 17; 19 and flow connections 21; 23 are completely filled with a 17 magnetorheological operating medium. Arranged concentrically outside of the cylinder is a permanent magnet 25 in the shape of a ring segment, which serves as a field force generating element. On account of the field force generated by the magnet 25, a change in viscosity of the operating medium occurs when the rotary piston 13, and thus also the first flow connection 21, is moved into the circumferential region of the permanent magnet 25.

In the first opening angle region α, the rotary piston can be moved via fluid flow through either of the two flow connections 21; 23 when the hydraulic resistances are overcome. In order to obtain a gentle stop function, it is logical to place the permanent magnet in such a way that the flow connection 21 enters the permanent magnet's area of influence at the end of the first opening angle region α. During the process, operating medium is forced out of the working space 19 and into the working space 17. The operating medium flowing through the flow connection 23 is not subject to a change in viscosity since the physical distance from the permanent magnet is too great. Only the usual hydraulic principles are in effect here.

If the door is opened further, or the rotary piston moved further toward the working space 19, the overlap between the permanent magnet and the rotary piston's lateral surface facing the inner wall increases. During the process, the viscosity of the operating medium is reduced such that a viscous mass is present at least in the first flow connection 21 and exerts a considerable locking effect. Although one can still open the door further, the door falls neither open nor closed when the vehicle is on an incline. If someone should open the door with considerable excess force, a hydraulic end-point damping system takes effect, which corresponds to the throttle resistance in the second flow connection. Finally, the stop 9 limits the door's opening range. In addition to the end-point damping system, the second flow connection 23 also ensures that underpressure is avoided in the working spaces 17; 19.

In order to implement another stop function, one could design the magnetic force to be variable in the circumferential direction, for instance by arranging the permanent magnet accordingly (see the dashed outline 25' in FIG. 2).

It is also possible to implement the permanent magnet 25 such that it is rotatable in the circumferential direction. By doing so, one could achieve that only one hydraulic damping is present in the flow connections 21; 23 for the door's entire opening angle range. Not until one rotates the permanent magnet into the region of the working spaces 17; 19 does the door lock in position. Especially easy movement of the door, and a strong locking effect in conjunction with minimal use of force are achieved by using the permanent magnet in this way.

Shown in FIG. 3 is an embodiment in which an electrorheological operating medium is used and the rotary piston 13 has two blades 15. Consequently there are four working spaces 17a; 17b; 19a; 19b with two first flow connections 21a; 21b and two second flow connections 23a; 23b. Provision is made for the cylinder 11 to be implemented as an electrode, and hence as a field force generating element. An insulating ring 27 is provided for external protection. As soon as voltage is applied to the electrode, the viscosity decreases in the first flow connections 21a; 21b. To control the door hinge, appropriate control electronics are provided, as described in U.S. Pat. No. 5,468,042. An especially convenient door hinge is achieved with the aid of these control electronics, which also include sensors for all the parameters characteristic of movement of the door.

What is claimed is:

1. A pivot bearing door hinge with a locking device based on a field force, comprising:

a cylinder in the form of a pivot eye of said hinge;

a rotary piston with at least one blade which divides the cylinder interior into at least two working spaces;

a field force generating element arranged concentrically to the cylinder, said field force generating element comprising a ring segment located radially outside the cylinder and having a circumferential extent to cover only a first rotation angle range of the rotary piston;

said working spaces being filled with an operating medium whose viscosity can be changed by means of a field force and being connected to one another by at least one flow connection that is subject to the influence of said field force generating element; and said at least one flow connection takes the form of a gap between said at least one blade and the inner wall of the cylinder.

2. A pivot bearing door hinge in accordance with claim 1, wherein the cylinder is provided with at least one rib as a stop for limiting the angle of rotation of the rotary piston.

3. A pivot bearing door hinge in accordance with claim 1, wherein a second flow connection is provided between said at least two working spaces, said second flow connecting defining a second throttling point for the door hinge.

4. A pivot bearing door hinge in accordance with claim 3, wherein the stop in the cylinder is comprised of a ring segment that has a circumferential groove forming the second flow connection.

5. A pivot bearing door hinge in accordance with claim 4, Wherein the second flow connection is implemented on the inner diameter of the stop.

6. A pivot bearing door hinge in accordance with claim 1, wherein the field force generating element is rotatable independently of the cylinder or the rotary piston.

7. A pivot bearing door hinge in accordance with claim 1, wherein the field force generating element comprises a permanent magnet, and the operating medium is a magnetorheological medium.

* * * * *

UNITED STATES PATENT AND TRADEMARK OFFICE
CERTIFICATE OF CORRECTION

PATENT NO.    : 6,314,612 B1
DATED         : November 13, 2001
INVENTOR(S)   : Rennecke et al.

Page 1 of 1

It is certified that error appears in the above-identified patent and that said Letters Patent is hereby corrected as shown below:

<u>Column 4,</u>
Line 43, "connecting" should read -- connection --
Line 50, "Wherein" should read -- wherein --

Signed and Sealed this

Twenty-third Day of April, 2002

Attest:

Attesting Officer

JAMES E. ROGAN
*Director of the United States Patent and Trademark Office*